United States Patent [19]

Hess

[11] 4,414,919

[45] Nov. 15, 1983

[54] FLOWDOWN REARING POND

[76] Inventor: W. John Hess, 123 Union St., Walla Walla, Wash. 99362

[21] Appl. No.: 315,552

[22] Filed: Oct. 27, 1981

[51] Int. Cl.³ ............................................. A01K 63/00
[52] U.S. Cl. ............................................. 119/3; 119/5
[58] Field of Search ............................... 119/2, 3, 4, 5; 210/413, 414

[56] References Cited

U.S. PATENT DOCUMENTS

| | | | |
|---|---|---|---|
| 3,465,718 | 9/1969 | Handman et al. | 119/2 |
| 3,469,705 | 9/1969 | Thomas | 210/414 X |
| 3,557,753 | 1/1971 | Dantoni | 119/2 |
| 3,971,338 | 7/1976 | Alexson | 119/5 |
| 4,002,566 | 1/1977 | Smith | 210/169 |
| 4,004,551 | 1/1977 | Kato | 119/5 |
| 4,025,431 | 5/1977 | Saxton | 210/108 |
| 4,043,299 | 8/1977 | Birkbeck | 119/3 |
| 4,052,960 | 10/1977 | Birkbeck | 119/3 |
| 4,067,809 | 1/1978 | Kato | 210/169 |
| 4,098,230 | 7/1978 | Jackson | 119/5 |
| 4,123,359 | 10/1978 | Smith | 210/169 |
| 4,140,079 | 2/1979 | Fruchtnicht | 119/3 |
| 4,182,267 | 1/1980 | Kominami et al. | 119/3 |
| 4,182,268 | 1/1980 | Berger | 119/3 |

Primary Examiner—Hugh R. Chamblee
Attorney, Agent, or Firm—Darrell E. Hollis

[57] ABSTRACT

A water recycling and filtering system for use in a fish rearing module is disclosed. The system includes a buoyant filter bed which is located beneath the fish rearing volume, horizontally disposed top and bottom screens for containing the buoyant filter bed, a water collector grid network for withdrawing the filtered water, a sludge scraper device for removing settled solids and sludge from the bottom screen and floor of the module, and; a wash-flight device for returning the filtered water under pressure to the module and washing the buoyant filter bed when needed. This construction allows the filter bed to be repeatedly and indefinitely rejuvenated without removing it from the pond and without requiring a large flow rate. Each module has its own isolated reuse-rearing unit and associated control and pumping equipment unit. Only one module at a time is vulnerable to a failure in the filtering or pumping performance. The only common connection between the modules is the sharing of the intake of makeup water and an outlet for sludge removal.

12 Claims, 2 Drawing Figures

FLOWDOWN REARING POND

STATEMENT OF GOVERNMENT INTEREST

The invention described and claimed herein may be manufactured and used by or for the Government of the United States of America for governmental purposes without the payment of royalties thereon or therefor.

BACKGROUND OF THE INVENTION

The present invention relates to the general field of recycling water filtering systems used in a fish rearing environment and more specifically to such systems in which solid wastes, ammonia and other organic impurities harmful to fish are present and need to be eliminated on a continuing basis.

Reuse or recycling of water is becoming more desirable as the demand for sport and commercial fish, and therefore, the need for more efficient hatcheries and ponds is increasing. Untreated water drawn from rivers or lakes subject fish stocks to low quality water, unsuitable variations in flow rate, undesirable solid content, disease and uncontrolled temperature. Reuse and recycling of water can provide a substantial reduction in actual water requirements, optimization of fish growth by regulation of the water temperatures, control of disease by purification and optimized flow rates.

The vast majority of conventional filtering systems are employed in the same location as the fish habitat and as a result the filter media is placed either on the bottom of the tank or pond or otherwise maintained beneath the water area in which the fish breed and live. In this type of a rearing environment, it is the general practice to wash the filter media by using an upward flow of fluid cleansing action. Such method suffers the disadvantage of the accumulated solid wastes being carried upward and into the area in which the fish are located, resulting in the increased pollution of the water and increased difficulty in capturing and removing such waste.

A known use of a downflow directed filtering system in which the filter media consisted of a four foot layer of half inch to three inch rock covered with a one foot layer of one quarter to three-quarter inch of oyster shells proved to have extensive operational problems related to the efficiency of the filtering capability, inadequate water flow and undesired algae growth. Prior to the present invention there has not been a recycling, downflow directed, water filtering system available or known that satisfactorily and efficiently removes solid wastes, ammonia and carbon dioxide while at the same time provides sufficient dissolved oxygen for fish respiration.

SUMMARY OF THE INVENTION

An object of the present invention is to provide a recycling water filtering system of the type used in fish rearing environments that is more efficient than heretofore available.

It is a further object of the present invention to provide a recycling water filtering system in which the filter media is located beneath the area of water wherein the fish are kept and wherein there is a down directed flow of fluid cleansing action to wash the filter media.

It is another object of the present invention to provide a recycling water filter system in which the filtering process is not interrupted during the filter media cleansing process.

It is yet another object of the present invention to provide a modular recycling water filtering system of the type described that can be used in existing fish rearing environments.

It is still another object of the present invention to provide a recycling water filtering system in which the horizontal water velocities have no negative effects on the efficiency of the filter media.

These and other objects of the invention are obtained by providing a water filtering system located beneath the area that fish are located and bred including a filter media composed of a bed of buoyant irregularly shaped granules held beneath the surface of the water by the top screen of a pair of horizontally disposed screens forming a basket-like structure in which the granules are housed. Located beneath the filter media, in the space between the bottom screen and the bottom of the buoyant filter bed, is a series of interconnected pipes having holes through which the filtered water is drawn by suction to be returned to the fish inhabiting section located above the filter bed. As will be explained in more detailed below, the filtered water may be directed through an aeration process, returned directly to the area inhabited by the fish or placed under high pressure and used to spray-wash the granules of the filter bed when the need arises.

During the spray-wash process the individual granules are physically displaced so that the entire mass of the buoyant granular filter bed constitutes a perpetually fluidized bed in which each granule moves with respect to its neighbor under differential water velocities.

DETAILED DESCRIPTION OF THE PREFERRED EMBODIMENT

Figure 1:
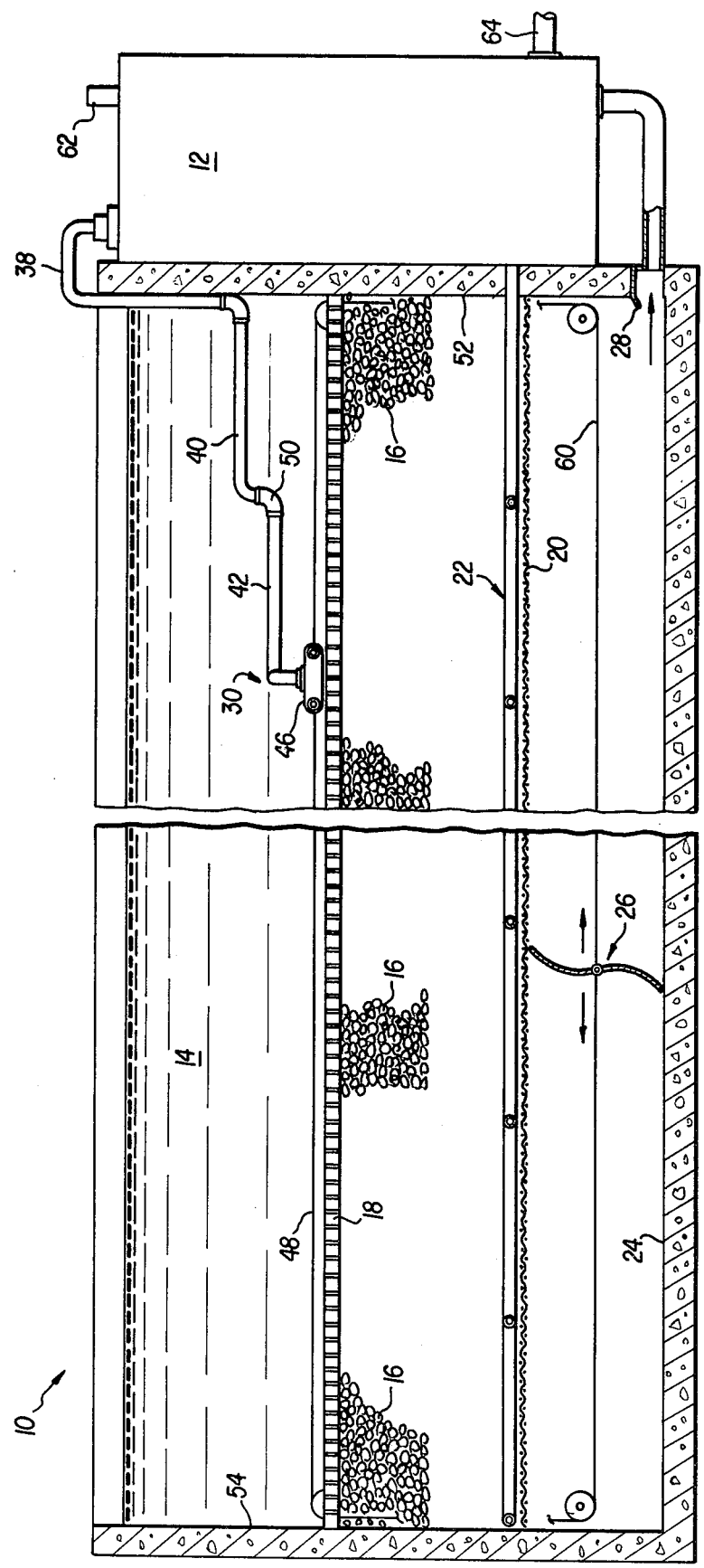
FIG. 1 is a vertical cross-section of the fish rearing module constructed in accordance with the present invention.
Figure 2:
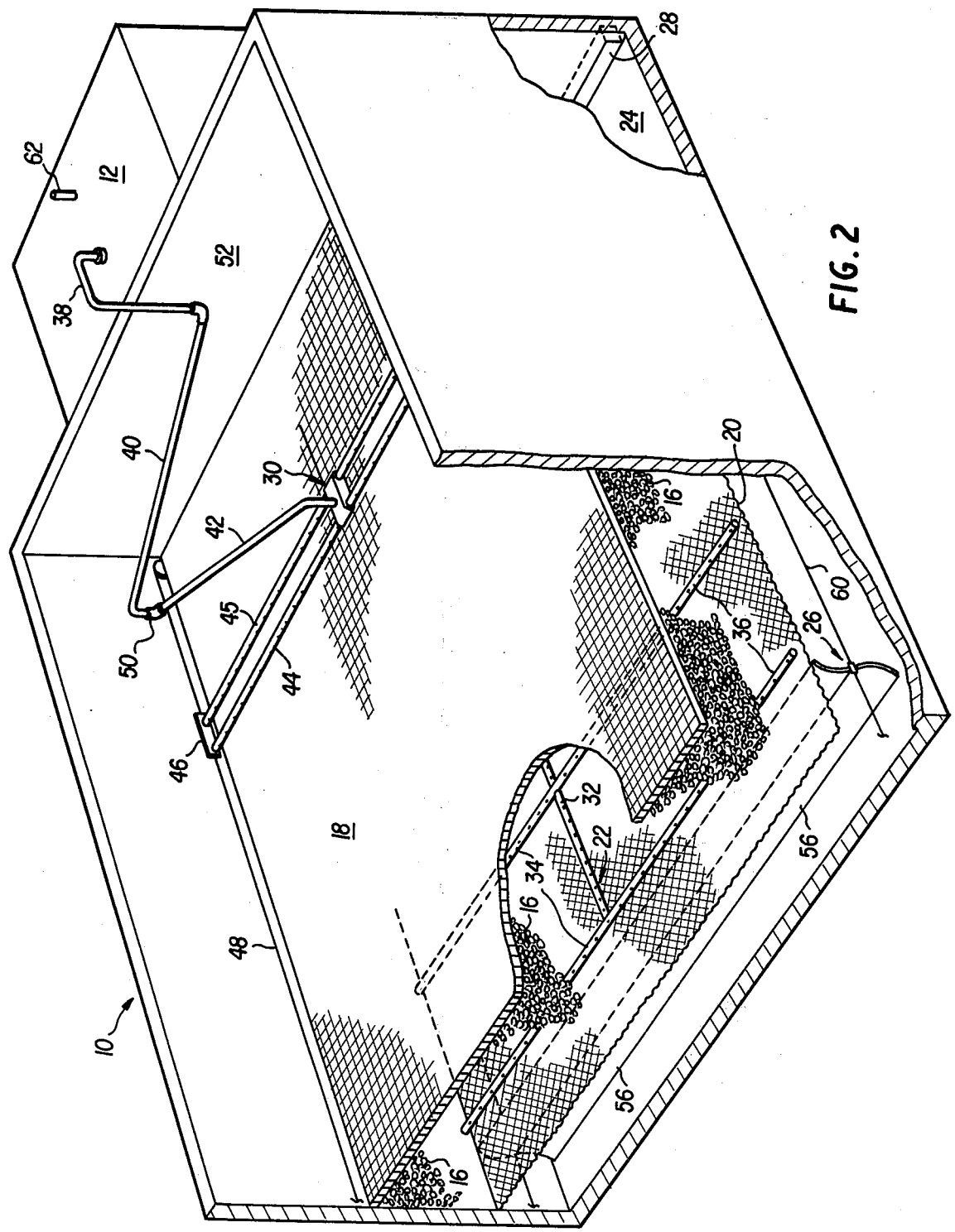
FIG. 2 is a perspective view of the fish-rearing module with the front wall and portions of a side wall broken away.

Referring now to the drawings, there is shown, in FIGS. 1 and 2, a flow-down, fish-rearing module generally indicated at 10. At any particular location either one or a plurality of modules 10 may be employed. Each module is comprised of an integrated control and pumping equipment section 12 and a fish-rearing volume container section 14. Within each fish-rearing volume section 14 a filter media 16 is contained between top and bottom horizontally disposed screens 18 and 20, respectively, and supported from within the section 14 in any known manner. Located between the bottom of the filter media 16 and above the top of the bottom screen 20 is a water intake collector grid 22, the purpose of which will be further explained below. Between the bottom screen 20 and the floor of the module 24 is scraper device 26. Positioned at one side end of the rearing volume container 14 is a sludge header 28. Positioned within the rearing volume container 14 and immediately above the top screen 18 is a washing device 30.

The filter media 16 is composed of foam-bed granules that are buoyant and are held in place by the basket-like effect of top and bottom screens 18 and 20, respectively. The use of foam-bed granules allows the filter media 16 to be buoyant, and it is understood that any suitable buoyant material may be used. The buoyancy makes the bed fluid so that each particle within the filter media will move with respect to its neighbors under differential water velocities and spill its burden of sediments without disturbing the rearing volume 14 above the top screen 18. Since the filter media 16 is buoyant, it will tend to rise to the top and push against the bottom of the top screen 18. The basket area between the top and bottom screens 18 and 20, respectively, is approximately half filled with the buoyant filter media 16. Thus, a space between the bottom of the filter media 16 and the top of the bottom screen 20 results that is large enough for placement of the collector grid 22, the purpose of which will be explained below. Additionally, because of the buoyance effects, the filter media 16 forms a floor to the fish environment that separates and reconditions the fish-rearing water in a manner to be later described.

The top screen 18, over the filter media 16, in addition to restraining the filter media from buoyant invasion into the rearing volume 14, affords support for anyone desiring to enter the module for closer observation of the fish, testing, or rendering medical attention. The bottom screen 20, of the filter basket, keeps the granules of the filter media 16 out of the scraper device 26 when the rearing volume container 14 is drained of water.

As described above, a collector grid network 22 is located between the bottom screen 20 and the filter media 16. The grid 22 consists of a central or main section of piping or tubing 32 interconnected at right angles with a plurality of similar tubes or pipes 34, 36 extending outwardly and along the entire length of the main pipe 32 in a direction perpendicular to the side walls of the module 10. The collector grid 22 performs the function of withdrawing filtered water from the rearing volume. Since the grid 22 is below the filter media 16, the water that is withdrawn will have been treated by mechanical filtering, biological filtering and settling, both types of filtering being accomplished by the filter media 16. Suction holes along the bottom of the grid members 32, 34, and 36 distribute the suction evenly across the underfilter area.

The rearing water is continuously circulated by the reuse-return pump (not shown), located in the module 12, and is returned back to the rearing-volume 14, via conduits 38, 40, and 42. A wash-flight apparatus, shown generally at 30, returns the water to the rearing volume 14 via outlet conduits 44 and 45. The wash-flight apparatus is driven across the surface of top screen 18 by means of its attachment to brackets 46, which ride on drive cables 48 (driven by any known means). A liquid tight swivel coupling 50 interconnects conduits 38, 40 and 42 as the wash-flight apparatus 30 travels across the top of the screen 18 back and forth between the end walls 52, 54 of the module. The reuse-return pump (not shown) located in the control module 12, supplies the suction for removing water from the collector grid and supplies pressure to the wash-flight 30, to optional (not shown) outside aeration processes, or the set of spray-aeration nozzles adjustable for control of velocities from the wash-flight apparatus 30 back into the rearing volume 14. The movement of the wash-flight apparatus 30 is according to adjustable cycles as set on an interval clock located in the control module 12. It is to be understood that any known control system could be employed for setting the travel speed of the wash-flight apparatus 30 and for automatically stopping the apparatus when resistance is encountered.

The wash-flight apparatus, shown generally at 30, allows the bed of buoyant filter granules 16 to be thoroughly washed by downwardly-directed jets from conduits 44 and 45 without disturbing the rearing volume 14 above the screen 18. Additionally, the screen 18 is kept clean by the downwardly-directed jets passing above it and by the movement of the granules 16 beneath the screen.

Located between the floor of the module 24 and the bottom screen 20 is the scraper-flight device, shown generally at 26, which makes possible the effective removal of solids and sludge that has settled on the floor of module 24 as a result of the washing of the filter media 16 via wash-flight 30. The solids and sludge is washed out of the filter media and settled to either collect on the bottom screen 20 or pass through screen 20 and settle on the floor of the module 24. The scraper-flight 26 is adapted to travel back and forth between the end walls 52 and 54 of the module in a manner similar to that of the above-described wash-flight device 30. The scraper-flight 26 is fitted with a flip-flop vane 56, which accumulates settled sludge on the bottom screen 20 and the floor of the module 24 in both directions of scraper travel. The vanes 56 are attached to brackets which are similar to brackets 46 of the wash-flight device 30, and which ride on cables 60 along the sides of the module 10. The accumulated sludge is swept toward a sludge-suction header 28. The header 28 is connected to a pumping apparatus in the control module 12.

The above-described flow-down, fish-rearing module allows a granular filter media 16 to be repeatedly and indefinitely rejuvenated without removing it from the pond and without requiring a large flow rate for washing the media and without otherwise disturbing the fish. Through the use of the disclosed modular system, providing a downward flow of rearing water, the cleansing of the filter granules 16 of suspended solids, ammonia and other organics is accomplished. Additionally, fish of all sizes can be prevented from reaching the underside of the filter by the correct sizing of the top screen 18 and no additional screening is needed to keep the fish from the exiting water and sludge streams. The down-directed jets of water from the return-reuse wash flight 30 wash the granules by spilling accumulated sediments into the clarification volume where they settle to the sludge-scraper 26. The scraper 26 allows the solids to be moved out of the systems, thereby preventing them from contributing to irritants, toxins or infections to the fish and the rearing volume.

The modular concept also allows each pond to have its own isolated reuse-rearing unit and control module or a plurality of such modules. The advantage in this is apparent in that only one module at a time is vulnerable to a failure in the filtering or pumping performance, and the only common connection between the modules is the sharing of the intake of makeup water through inlet conduit 62 for the module and an outlet for sludge removal through conduit 64.

It is to be understood that while I have illustrated and described one form of my invention, it is not to be limited to the specific form or arrangement of parts herein described and shown.

What I claim and desire to secure by Letter Patent is:
 1. A fish rearing, water-recirculating module comprising;
   (a) a housing having a filter media space therein;
   (b) a fluid filter media located within said filter media space;

(c) means, located below said filter media space for collecting water that has passed through said filter media;

(d) means for returning said filtered water to a location above said filter media space, and;

(e) means for spraying said returned water to cleanse said filter media.

2. A fish rearing, water-recirculating module according to claim 1 wherein said filter media includes a plurality of buoyant particles, said particles being agitated by water velocities created by said spraying means.

3. A fish rearing, water-recirculating module according to claim 1 wherein said filter media space is defined by a top horizontally disposed screen and a bottom horizontally disposed screen.

4. A fish rearing, water-recirculating module according to claim 1 wherein said collecting means is a collector grid pipe which passes through a wall of said module, whereby said collected water is returned to said returning means.

5. A fish rearing, water-recirculating module according to claim 4 wherein said collector grid consists of a central section of pipe interconnected at right angles with a plurality of pipes which extend outwardly in a direction perpendicular to both side walls of said module, said pipes being provided with suction holes whereby water is collected and removed from said module.

6. A fish rearing, water-recirculating module according to claim 1 wherein said returning means is a control and pumping equipment section interconnected between said second means and said fourth means.

7. A fish rearing, water-recirculating module according to claim 1 wherein said spraying means comprises;
outlet conduit means connected between said returning means and a wash-flight device for returning said filtered water under pressure to said module.

8. A fish rearing, water-recirculating module according to claim 7 wherein said wash-flight device comprises;
a central section adapted to be connected between said outlet conduit means and a pair of spaced, parallel outlet delivery conduits.

9. A fish rearing, water-recirculating module according to claim 7 wherein said wash-flight device is adapted to traverse the length of said module for evenly distributing said filtered water, whereby said filter media is washed by downwardly directed jets of said filtered water from said outlet delivery conduits.

10. A fish rearing, water-recirculating module according to claim 1, further comprising;
a scraper-flight device located between said bottom screen and the floor of said module for scraping settled solids and sludge from said bottom screen and said floor of said module.

11. A fish rearing, water-recirculating module according to claim 10 wherein said scraper-flight device is adapted to traverse the length of said module for sweeping said solids and sludge to a sludge suction header, whereby said solids and sludge are effectively removed from said module.

12. A fish rearing, water-recirculating module according to claim 11 wherein said sludge suction header outlet is connected to said returning means.

* * * * *